(12) United States Patent
Tanishige et al.

(10) Patent No.: US 12,412,379 B2
(45) Date of Patent: Sep. 9, 2025

(54) LEARNING APPARATUS, METHOD FOR CONTROL THE SAME, AND CONTROL PROGRAM

(71) Applicant: TOYOTA JIDOSHA KABUSHIKI KAISHA, Toyota (JP)

(72) Inventors: Suomi Tanishige, Tokyo-to (JP); Akiyoshi Ochiai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 18/181,195

(22) Filed: Mar. 9, 2023

(65) Prior Publication Data

US 2023/0290129 A1    Sep. 14, 2023

(30) Foreign Application Priority Data

Mar. 14, 2022   (JP) ................. 2022-039112

(51) Int. Cl.
*G06V 10/77*  (2022.01)
*G06V 10/764*  (2022.01)
*G06V 10/774*  (2022.01)
*G06V 10/776*  (2022.01)

(52) U.S. Cl.
CPC .......... *G06V 10/776* (2022.01); *G06V 10/764* (2022.01); *G06V 10/774* (2022.01)

(58) Field of Classification Search
CPC .. G06V 10/776; G06V 10/764; G06V 10/774; G06V 10/778; G06V 10/94; G06V 10/993; G06V 20/05
See application file for complete search history.

(56) References Cited

U.S. PATENT DOCUMENTS

2016/0140436 A1 * 5/2016 Yin ..................... G06F 18/2431
706/20
2021/0326651 A1 * 10/2021 Northcutt ........... G06V 10/7747

FOREIGN PATENT DOCUMENTS

| JP | 06-054503 B2 | 7/1994 |
| JP | 2016-099668 A | 5/2016 |
| WO | 2020/230459 A1 | 11/2020 |
| WO | WO 2022/024366 * | 2/2022 |

OTHER PUBLICATIONS

Machine translation for WO 2022/024366 (Year: 2022).*

* cited by examiner

*Primary Examiner* — Qian Yang
(74) *Attorney, Agent, or Firm* — Sughrue Mion, PLLC

(57) ABSTRACT

A learning apparatus includes: an extraction unit that extracts a first false recognition target which is a recognition target in regard to which a probability that a first recognition device falsely recognizes it as a first recognition target from among a plurality of types of recognition targets is equal to or greater than a predetermined percentage; a training data generation unit that generates first training data that includes an image including both the first recognition target and the first false recognition target; and a learning control unit that makes, by using the first training data, a first recognition device learn that the first false recognition target is a recognition target of a type different from that of the first recognition target.

17 Claims, 9 Drawing Sheets

Fig. 6

LEARNING APPARATUS, METHOD FOR CONTROL THE SAME, AND CONTROL PROGRAM

CROSS REFERENCE TO RELATED APPLICATIONS

This application is based upon and claims the benefit of priority from Japanese patent application No. 2022-039112, filed on Mar. 14, 2022, the disclosure of which is incorporated herein in its entirety by reference.

BACKGROUND

The present disclosure relates to a learning apparatus, a method for controlling the same, and a control program.

In recent years, learning apparatuses for making each of a plurality of recognition devices learn so that it recognizes a corresponding one of a plurality of types of products (recognition targets) sold in stores such as convenience stores have been developed.

A technique related to learning by a recognition device is disclosed, for example, in Japanese Examined Patent Application Publication No. H6-54503. Japanese Examined Patent Application Publication No. H6-54503 discloses a pattern recognition apparatus that recognizes an input pattern by comparing it with a recognition dictionary, identifies a true category in the input pattern and a category obtained as a result of false recognition based on a result of the recognition, inputs, as a pattern for learning, a pattern including the true category that has caused the false recognition and a pattern including the category obtained as the result of false recognition, and performs learning and updating of the recognition dictionary by using each of the patterns.

SUMMARY

However, Japanese Examined Patent Application Publication No. H6-54503 neither discloses nor suggests that when each of a plurality of recognition devices is made to learn so as to recognize a corresponding one of a plurality of types of recognition targets, each of the plurality of recognition devices is made to perform learning efficiently so that false recognition among the plurality of types of recognition targets does not occur. Therefore, the configuration disclosed in Japanese Examined Patent Application Publication No. H6-54503 has a problem that it is not possible to make each of the plurality of recognition devices perform learning efficiently so that false recognition among the plurality of types of recognition targets does not occur.

The present disclosure has been made in view of the aforementioned circumstances and an object thereof is to provide a learning apparatus, a method for controlling the same, and a control program that can make each of a plurality of recognition devices that recognize a corresponding one of a plurality of types of recognition targets perform learning efficiently so that false recognition among the plurality of types of recognition targets does not occur.

A first exemplary aspect is a learning apparatus configured to make a first recognition device learn so that the first recognition device recognizes a first recognition target from among a plurality of types of recognition targets, the first recognition target being a recognition target of a first type, the learning apparatus including: an extraction unit configured to extract a first false recognition target, the first false recognition target being a recognition target in regard to which a probability that the first recognition device falsely recognizes it as the first recognition target from among the plurality of types of recognition targets is equal to or greater than a predetermined percentage; a training data generation unit configured to generate first training data that includes an image including both the first recognition target and the first false recognition target; and a learning control unit configured to make, by using the first training data, the first recognition device learn that the first false recognition target is a recognition target of a type different from that of the first recognition target. In learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the above learning apparatus makes the first recognition device learn that the false recognition target is a recognition target of a type different from that of the first recognition target. By doing so, the above learning apparatus can make the first recognition device perform learning more efficiently than when it makes the first recognition device learn so that it recognizes all of recognition targets other than the first recognition target as recognition targets of types different from that of the first recognition target. As a result, the above learning apparatus can make each of a plurality of recognition devices that recognize a corresponding one of a plurality of types of recognition targets perform learning efficiently so that false recognition among the plurality of types of recognition targets does not occur.

The learning control unit may be configured to control, when the probability that the first recognition device falsely recognizes the first false recognition target as the first recognition target becomes less than the predetermined percentage, the first recognition device so that the first recognition device stops the learning using the first training data.

The learning apparatus may further include an evaluation unit, in which the training data generation unit may be configured to further generate reference training data that includes a plurality of images each individually including a respective one of the plurality of types of recognition targets, the learning control unit may be configured to make, by using the reference training data, the first recognition device learn in advance so that the first recognition device correctly recognizes the first recognition target as the first recognition target and so that the first recognition device does not falsely recognize a recognition target other than the first recognition target as the first recognition target, the evaluation unit may be configured to evaluate whether the first recognition device correctly recognizes the first recognition target as the recognition target and whether the first recognition device does not falsely recognize a recognition target other than the first recognition target as the first recognition target, and the extraction unit may be configured to extract the first false recognition target from a result of the evaluation by the evaluation unit.

The training data generation unit may be configured to generate the first training data that includes a plurality of images each including both the first recognition target and the first false recognition target, and the learning control unit may be configured to make, by using the first training data, the first recognition device learn that the first false recognition target is a recognition target of a type different from that of the first recognition target until the probability that the first recognition device falsely recognizes the first false recognition target as the first recognition target becomes less than the predetermined percentage.

The training data generation unit may be configured to generate, when the extraction unit extracts a plurality of the first false recognition targets, each of which is a recognition target in regard to which a probability that the first recognition device falsely recognizes it as the first recognition target is equal to or greater than a predetermined percentage, the first training data that includes a plurality of images each including both the first recognition target and each one of the plurality of the first false recognition targets, and the learning control unit may be configured to make, by using the first training data, the first recognition device learn that each of the plurality of the first false recognition targets is a recognition target of a type different from that of the first recognition target until the probability that the first recognition device falsely recognizes each of the plurality of the first false recognition targets as the first recognition target becomes less than the predetermined percentage.

The learning apparatus may be configured to further make a second recognition device learn so that the second recognition device recognizes a second recognition target from among the plurality of types of recognition targets, the second recognition target being a recognition target of a second type, the extraction unit may be configured to further extract a second false recognition target, the second false recognition target being a recognition target in regard to which a probability that the second recognition device falsely recognizes it as the second recognition target from among the plurality of types of recognition targets is equal to or greater than a predetermined percentage, the training data generation unit may be configured to further generate second training data that includes an image including both the second recognition target and the second false recognition target, and the learning control unit may be configured to further make, by using the second training data, the second recognition device learn that the second false recognition target is a recognition target of a type different from that of the second recognition target.

The learning control unit may be configured to control, when the probability that the second recognition device falsely recognizes the second false recognition target as the second recognition target becomes less than the predetermined percentage, the second recognition device so that the second recognition device stops the learning using the second training data.

The learning apparatus may further include an evaluation unit, in which the training data generation unit may be configured to further generate reference training data that includes a plurality of images each individually including a respective one of the plurality of types of recognition targets, the learning control unit may be configured to make, by using the reference training data, the first recognition device learn in advance so that the first recognition device correctly recognizes the first recognition target as the first recognition target and so that the first recognition device does not falsely recognize a recognition target other than the first recognition target as the first recognition target and make the second recognition device learn in advance so that the second recognition device correctly recognizes the second recognition target as the second recognition target and so that the second recognition device does not falsely recognize a recognition target other than the second recognition target as the second recognition target, the evaluation unit may be configured to evaluate whether the first recognition device correctly recognizes the first recognition target as the recognition target and whether the first recognition device does not falsely recognize a recognition target other than the first recognition target as the first recognition target and evaluate whether the second recognition device correctly recognizes the second recognition target as the recognition target and whether the second recognition device does not falsely recognize a recognition target other than the second recognition target as the second recognition target, and the extraction unit may be configured to extract the first false recognition target and the second false recognition target from a result of the evaluation by the evaluation unit.

The evaluation unit may be configured to further evaluate, when a third recognition target that is a new recognition target of a third type is added to the plurality of types of recognition targets, whether the first recognition device does not falsely recognize the third recognition target as the first recognition target before the first recognition device learns that the third recognition target is not the first recognition target, and the extraction unit may be configured to extract, from a result of the evaluation by the evaluation unit, the first false recognition target in regard to which a probability that the first recognition device falsely recognizes it as the first recognition target from among the plurality of types of recognition targets including the third recognition target is equal to or greater than a predetermined percentage.

The evaluation unit may be configured to further evaluate, when a third recognition target that is a new recognition target of a third type is added to the plurality of types of recognition targets, whether the first recognition device does not falsely recognize the third recognition target as the first recognition target before the first recognition device learns that the third recognition target is not the first recognition target and whether the second recognition device does not falsely recognize the third recognition target as the second recognition target before the second recognition device learns that the third recognition target is not the second recognition target, and the extraction unit may be configured to extract, from a result of the evaluation by the evaluation unit, the first false recognition target in regard to which a probability that the first recognition device falsely recognizes it as the first recognition target from among the plurality of types of recognition targets including the third recognition target is equal to or greater than a predetermined percentage, and the second false recognition target in regard to which a probability that the second recognition device falsely recognizes it as the second recognition target from among the plurality of types of recognition targets including the third recognition target is equal to or greater than a predetermined percentage.

The training data generation unit may be configured to update the reference training data so as to further include an image including only the third recognition target from among the plurality of types of recognition targets, and the learning control unit may be configured to, when the probability that the first recognition device falsely recognizes the first false recognition target as the first recognition target is maintained at or above the predetermined percentage even though the first recognition device has performed the learning using the first training data, initialize contents learned by the first recognition device and then make the first recognition device perform learning using at least the updated reference training data.

The training data generation unit may be configured to update the reference training data so as to further include an image including only the third recognition target among the plurality of types of recognition targets, and the learning control unit may be configured to, when the probability that the first recognition device falsely recognizes the first false recognition target as the first recognition target is maintained at or above the predetermined percentage even though the first recognition device has performed the learning using the first training data, initialize contents learned by the first recognition device and then make the first recognition device perform learning using at least the updated reference training data and configured to, when the probability that the second recognition device falsely recognizes the second false recognition target as the second recognition target is maintained at or above the predetermined percentage even though the second recognition device has performed the learning using the second training data, initialize contents learned by the second recognition device and then make the second recognition device perform learning using at least the updated reference training data.

The learning apparatus may be further configured to make a third recognition device learn so that the third recognition device recognizes the third recognition target from among the plurality of types of recognition targets, the extraction unit may be configured to further extract a third false recognition target, the third false recognition target being a recognition target in regard to which a probability that the third recognition device falsely recognizes it as the third recognition target from among the plurality of types of recognition targets is equal to or greater than a predetermined percentage, the training data generation unit may be configured to further generate third training data that includes an image including both the third recognition target and the third false recognition target, and the learning control unit may be configured to further make, by using the third training data, the third recognition device learn that the third false recognition target is a recognition target of a type different from that of the third recognition target.

The extraction unit may be configured to, when a fourth recognition target that is a recognition target of a fourth type is excluded from the plurality of types of recognition targets, newly extract the first false recognition target in regard to which a probability that the first recognition device falsely recognizes it as the first recognition target from among the plurality of types of recognition targets excluding the fourth recognition target in a state in which the contents learned by the first recognition device using the first training data have been initialized by the learning control unit, the training data generation unit may be configured to newly generate the first training data that includes an image including both the first recognition target and the newly extracted first false recognition target, and the learning control unit may be configured to make the first recognition device perform learning using the newly generated first training data in addition to initializing the contents learned by the first recognition device using the first training data.

The extraction unit may be configured to, when a fourth recognition target that is a recognition target of a fourth type is excluded from the plurality of types of recognition targets, newly extract the first false recognition target in regard to which a probability that the first recognition device falsely recognizes it as the first recognition target from among the plurality of types of recognition targets excluding the fourth recognition target and the second false recognition target in regard to which a probability that the second recognition device falsely recognizes it as the second recognition target from among the plurality of types of recognition targets excluding the fourth recognition target in a state in which the contents learned by the first recognition device using the first training data have been initialized by the learning control unit and the contents learned by the second recognition device using the second training data have been initialized by the learning control unit, the training data generation unit may be configured to newly generate the first training data that includes an image including both the first recognition target and the newly extracted first false recognition target and the second training data that includes an image including both the second recognition target and the newly extracted second false recognition target, and the learning control unit may be configured to make the first recognition device perform learning using the newly generated first training data in addition to initializing the contents learned by the first recognition device using the first training data and configured to make the second recognition device perform learning using the newly generated second training data in addition to initializing the contents learned by the second recognition device using the second training data.

Another exemplary aspect is a method for controlling a learning apparatus configured to make a first recognition device at least learn so that the first recognition device recognizes a first recognition target from among a plurality of types of recognition targets, the first recognition target being a recognition target of a first type, the method including: extracting a first false recognition target, the first false recognition target being a recognition target in regard to which a probability that the first recognition device falsely recognizes it as the first recognition target from among the plurality of types of recognition targets is equal to or greater than a predetermined percentage; generating first training data that includes an image including both the first recognition target and the first false recognition target; and making, by using the first training data, the first recognition device learn that the first false recognition target is a recognition target of a type different from that of the first recognition target. In learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the above method for controlling a learning apparatus makes the first recognition device learn that the false recognition target is a recognition target of a type different from that of the first recognition target. By doing so, the above method for controlling a learning apparatus can make the first recognition device perform learning more efficiently than when it makes the first recognition device learn so that it recognizes all of recognition targets other than the first recognition target as recognition targets of types different from that of the first recognition target. As a result, the above method for controlling a learning apparatus can make each of a plurality of recognition devices that recognize a corresponding one of a plurality of types of recognition targets perform learning efficiently so that false recognition among the plurality of types of recognition targets does not occur.

Another exemplary aspect is a control program for a learning apparatus configured to make a first recognition device at least learn so that the first recognition device recognizes a first recognition target from among a plurality of types of recognition targets, the first recognition target being a recognition target of a first type, the control program causing a computer to: extract a first false recognition target, the first false recognition target being a recognition target in regard to which a probability that the first recognition device falsely recognizes it as the first recognition target from among the plurality of types of recognition targets is equal to or greater than a predetermined percentage; generate first training data that includes an image including both the first recognition target and the first false recognition target; and make, by using the first training data, the first recognition device learn that the first false recognition target is a recognition target of a type different from that of the first recognition target. In learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the above control program makes the first recognition device learn that the false recognition target is a recognition target of a type different from that of the first recognition target. By doing so, the above control program can make the first recognition device perform learning more efficiently than when it makes the first recognition device learn so that it recognizes all of recognition targets other than the first recognition target as recognition targets of types different from that of the first recognition target. As a result, the above control program can make each of a plurality of recognition devices that recognize a corresponding one of a plurality of types of recognition targets perform learning efficiently so that false recognition among the plurality of types of recognition targets does not occur.

According to the present disclosure, it is possible to provide a learning apparatus, a method for controlling the same, and a control program that can make each of a plurality of recognition devices that recognize a corresponding one of a plurality of types of recognition targets perform learning efficiently so that false recognition among the plurality of types of recognition targets does not occur.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
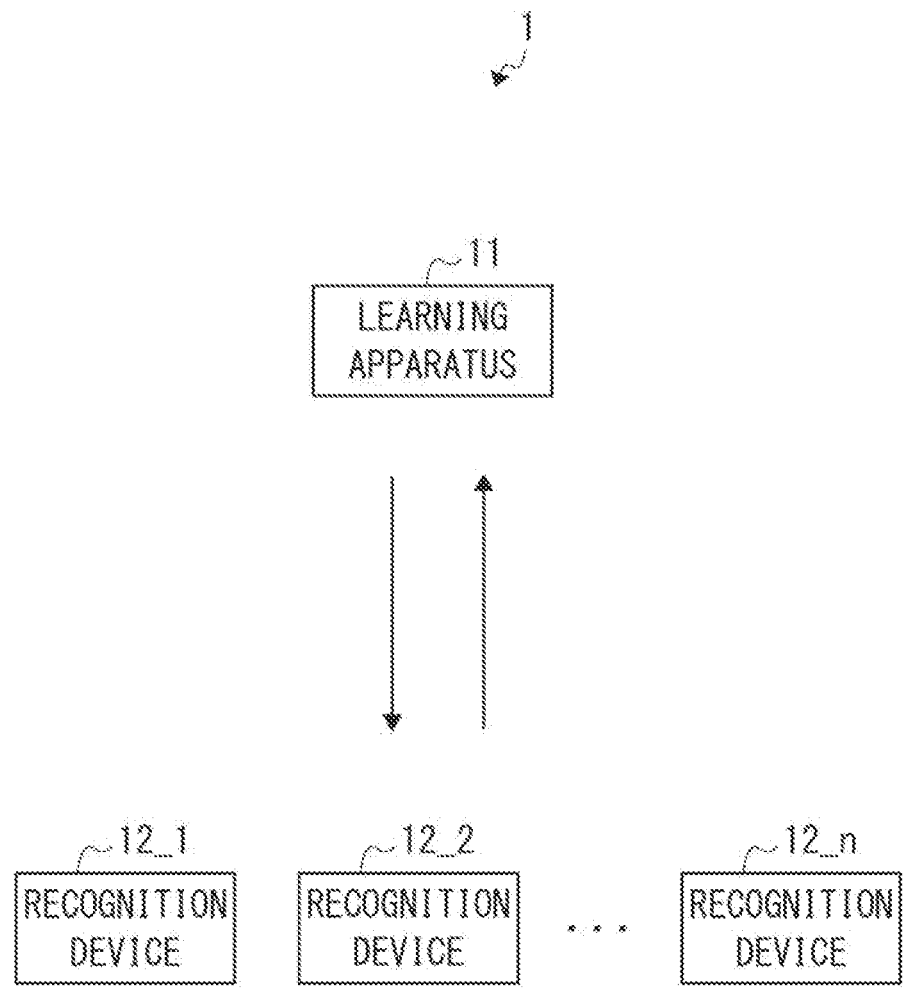
FIG. 1 is a block diagram showing an example of a configuration of a learning system according to a first embodiment.

The present disclosure will be described hereinafter through embodiments of the present disclosure. However, the following embodiments are not intended to limit the scope of the disclosure according to the claims. Further, all the components/structures described in the embodiments are not necessarily indispensable as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a block diagram showing an example of a configuration of a learning system 1 according to a first embodiment. The learning system 1 is a system that makes each of a plurality of recognition devices learn so that it recognizes a corresponding one of a plurality of types of recognition targets by using a learning apparatus 11. In learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the learning apparatus 11 provided in the learning system 1 makes the first recognition device learn that the false recognition target is a recognition target of a type different from that of the first recognition target. By doing so, the learning apparatus 11 can make the first recognition device perform learning more efficiently than when it makes the first recognition device learn so that it recognizes all of recognition targets other than the first recognition target as recognition targets of types different from that of the first recognition target. As a result, the learning apparatus 11 can make each of a plurality of recognition devices that recognize a corresponding one of a plurality of types of recognition targets perform learning efficiently so that false recognition among the plurality of types of recognition targets does not occur. The details of the above configuration will be described below.

As shown in FIG. 1, the learning system 1 includes the learning apparatus 11 and n (n is an integer greater than or equal to two) recognition devices 12_1 to 12_n.

Each of the n recognition devices 12_1 to 12_n is an apparatus for recognizing a corresponding one of recognition targets TG1 to TGn of n types. The recognition targets TG1 to TGn of the n types are, for example, n types of products sold in stores such as convenience stores.

For example, the recognition device (first recognition device) 12_1 is an apparatus for recognizing the recognition target (first recognition target) TG1 of a first type from among recognition targets of n types. Further, the recognition device (second recognition device) 12_2 is an apparatus for recognizing the recognition target (second recognition target) TG2 of a second type from among the recognition targets TG1 to TGn of n types. Similarly, the recognition device 12_i (i is any integer from one to n) is an apparatus for recognizing the recognition target TGi of an i type from among the recognition targets TG1 to TGn of n types.

The learning apparatus 11 makes each of the recognition devices 12_1 to 12_n learn so that it recognizes a corresponding one of the recognition targets TG1 to TGn. In other words, the learning apparatus 11 trains each of the recognition devices 12_1 to 12_n so that it recognizes a corresponding one of the recognition targets TG1 to TGn.

For example, the learning apparatus 11 makes the recognition device 12_1 learn so that it recognizes the recognition target TG1 of the first type from among the recognition targets TG1 to TGn. Further, the learning apparatus 11 makes the recognition device 12_2 learn so that it recognizes the recognition target TG2 of the second type from among the recognition targets TG1 to TGn. Similarly, the learning apparatus 11 makes the recognition device 12_i learn so that it recognizes the recognition target TGi of the i type from among the recognition targets TG1 to TGn.

Figure 2:
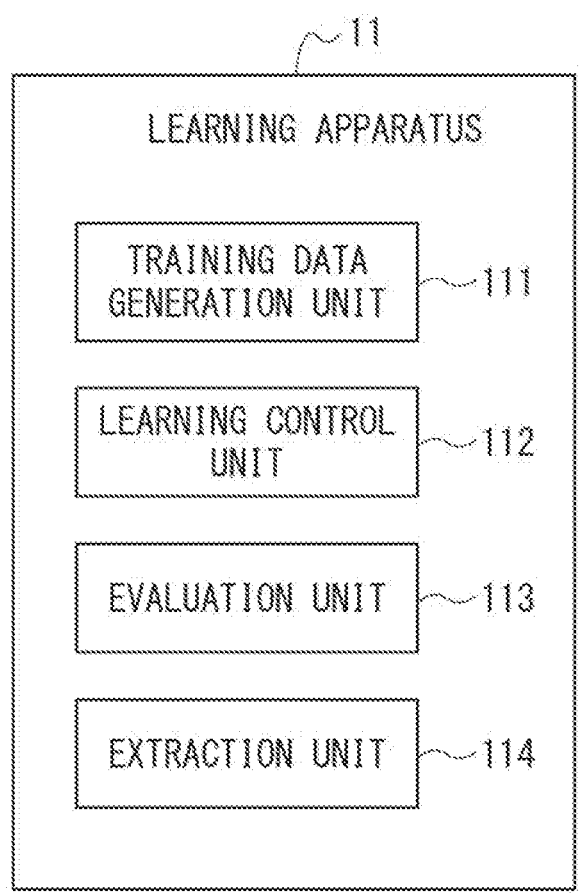
FIG. 2 is a block diagram showing an example of a configuration of a learning apparatus according to the first embodiment.

FIG. 2 is a block diagram showing an example of a configuration of the learning apparatus 11. As shown in FIG. 2, the learning apparatus 11 includes at least a training data generation unit 111, a learning control unit 112, an evaluation unit 113, and an extraction unit 114.

The training data generation unit 111 generates training data used in the learning performed by the recognition devices 12_1 to 12_n.

Specifically, the training data generation unit 111 generates reference training data that includes a plurality of images each individually including a respective one of the recognition targets TG1 to TGn. In other words, the training data generation unit 111 generates reference training data that includes a plurality of images each solely including a respective one of the recognition targets TG1 to TGn. Further, the training data generation unit 111 generates additional training data. The generation of additional training data performed by the training data generation unit 111 will be described later.

The learning control unit 112 makes the recognition devices 12_1 to 12_n perform learning using training data generated by the training data generation unit 111.

For example, the learning control unit 112 makes, by using the reference training data, the recognition device 12_1 learn so that it correctly recognizes the recognition target TG1 as the recognition target TG1 and so that it does not falsely recognize a recognition target other than the recognition target TG1 as the recognition target TG1. Further, the learning control unit 112 makes, by using the reference training data, the recognition device 12_2 learn so that it correctly recognizes the recognition target TG2 as the recognition target TG2 and so that it does not falsely recognize a recognition target other than the recognition target TG2 as the recognition target TG2. Similarly, the learning control unit 112 makes, by the reference training data, the recognition device 12_i learn so that it correctly recognizes the recognition target TGi as the recognition target TGi and so that it does not falsely recognize a recognition target other than the recognition target TGi as the recognition target TGi. Further, the learning control unit 112 makes the recognition devices 12_1 to 12_n perform additional learning using additional training data. The learning control using the additional training data performed by the learning control unit 112 will be described later.

The evaluation unit 113 evaluates whether or not each of the recognition devices 12_1 to 12_n correctly recognizes a specified recognition target. Note that, in the evaluations of the recognition devices 12_1 to 12_n performed by the evaluation unit 113, a real recognition target or an image including a recognition target may be used.

For example, the evaluation unit 113 evaluates whether the recognition device 12_1 correctly recognizes the recognition target TG1 as the recognition target TG1 and whether the recognition device 12_1 does not falsely recognize a recognition target other than the recognition target TG1 as the recognition target TG1. Further, the evaluation unit 113 evaluates whether the recognition device 12_2 correctly recognizes the recognition target TG2 as the recognition target TG2 and whether the recognition device 12_2 does not falsely recognize a recognition target other than the recognition target TG2 as the recognition target TG2. Similarly, the evaluation unit 113 evaluates whether the recognition device 12_i correctly recognizes the recognition target TGi as the recognition target TGi and whether the recognition device 12_i does not falsely recognize a recognition target other than the recognition target TGi as the recognition target TGi.

The extraction unit 114 extracts a false recognition target in regard to which a probability that each of the recognition devices 12_1 to 12_n falsely recognizes it as a specified recognition target is equal to or greater than a predetermined percentage.

For example, the extraction unit 114 extracts a false recognition target (first false recognition target) FTG1, which is a recognition target in regard to which a probability that the recognition device 12_1 falsely recognizes it as the recognition target TG1 from among the recognition targets TG1 to TGn is equal to or greater than a predetermined percentage. Further, the extraction unit 114 extracts a false recognition target (second false recognition target) FTG2, which is a recognition target in regard to which a probability that the recognition device 12_2 falsely recognizes it as the recognition target TG2 from among the recognition targets TG1 to TGn is equal to or greater than a predetermined percentage. Similarly, the extraction unit 114 extracts a false recognition target FTGi, which is a recognition target in regard to which a probability that the recognition device 12_i falsely recognizes it as the recognition target TGi from among the recognition targets TG1 to TGn is equal to or greater than a predetermined percentage.

Note that the training data generation unit 111 further generates, in addition to reference training data that includes a plurality of images each individually including a respective one of the recognition targets TG1 to TGn, additional training data that includes an image including both the false recognition target extracted by the extraction unit 114 and the recognition target.

For example, the training data generation unit 111 generates, for example, additional training data (first training data) that includes an image including both the false recognition target FTG1, which is a recognition target in regard to which a probability that the recognition device 12_1 falsely recognizes it as the recognition target TG1 from among the recognition targets TG1 to TGn is equal to or greater than a predetermined percentage, and the recognition target TG1. Further, the training data generation unit 111 generates, for example, additional training data (second training data) that includes an image including both the false recognition target FTG2, which is a recognition target in regard to which a probability that the recognition device 12_2 falsely recognizes it as the recognition target TG2 from among the recognition targets TG1 to TGn is equal to or greater than a predetermined percentage, and the recognition target TG2. Similarly, the training data generation unit 111 generates, for example, additional training data that includes an image including both the false recognition target FTGi, which is a recognition target in regard to which a probability that the recognition device 12_i falsely recognizes it as the recognition target TGi from among the recognition targets TG1 to TGn is equal to or greater than a predetermined percentage, and the recognition target TGi.

Then, the learning control unit 112 makes the recognition devices 12_1 to 12_n perform additional learning using the additional training data generated by the training data generation unit 111.

For example, the learning control unit 112 makes, by using the additional training data that includes an image including both the false recognition target FTG1 and the recognition target TG1, the recognition device 12_1 learn that the false recognition target FTG1 is a recognition target of a type different from that of the recognition target TG1. Further, the learning control unit 112 makes, by using the additional training data that includes an image including both the false recognition target FTG2 and the recognition target TG2, the recognition device 12_2 learn that the false recognition target FTG2 is a recognition target of a type different from that of the recognition target TG2. Similarly, the learning control unit 112 makes, by using the additional training data that includes an image including both the false recognition target FTGi and the recognition target TGi, the recognition device 12_i learn that the false recognition target FTGi is a recognition target of a type different from that of the recognition target TGi.

Note that, when the false recognition targets FTG1 to FTGn are no longer present, the learning control unit 112 controls the recognition devices 12_1 to 12_n so that they stop learning.

(Operations Performed by the Learning Apparatus 11)

Figure 3:
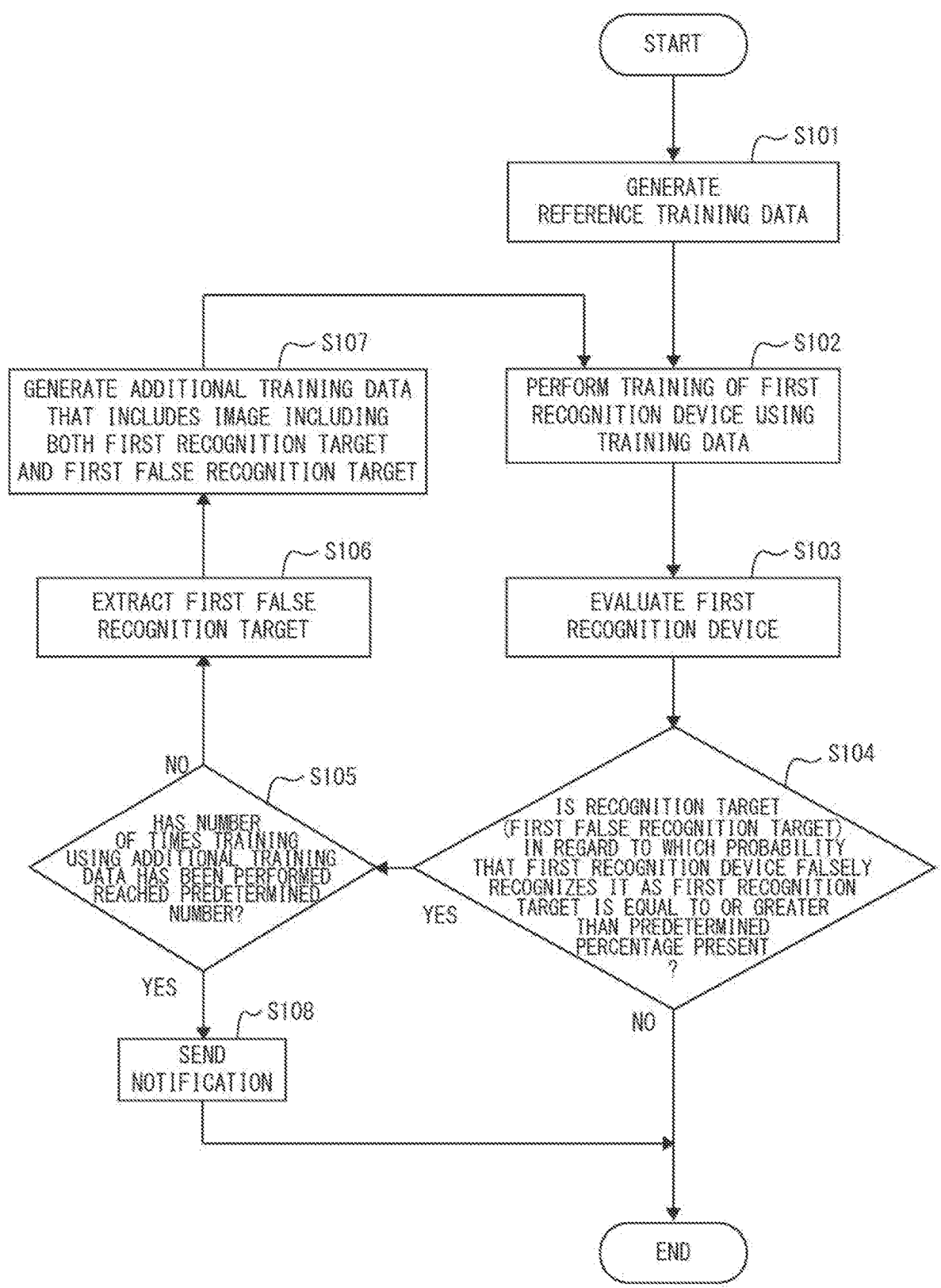
FIG. 3 is a flowchart showing operations performed by the learning apparatus shown in FIG. 2.
Figure 4:
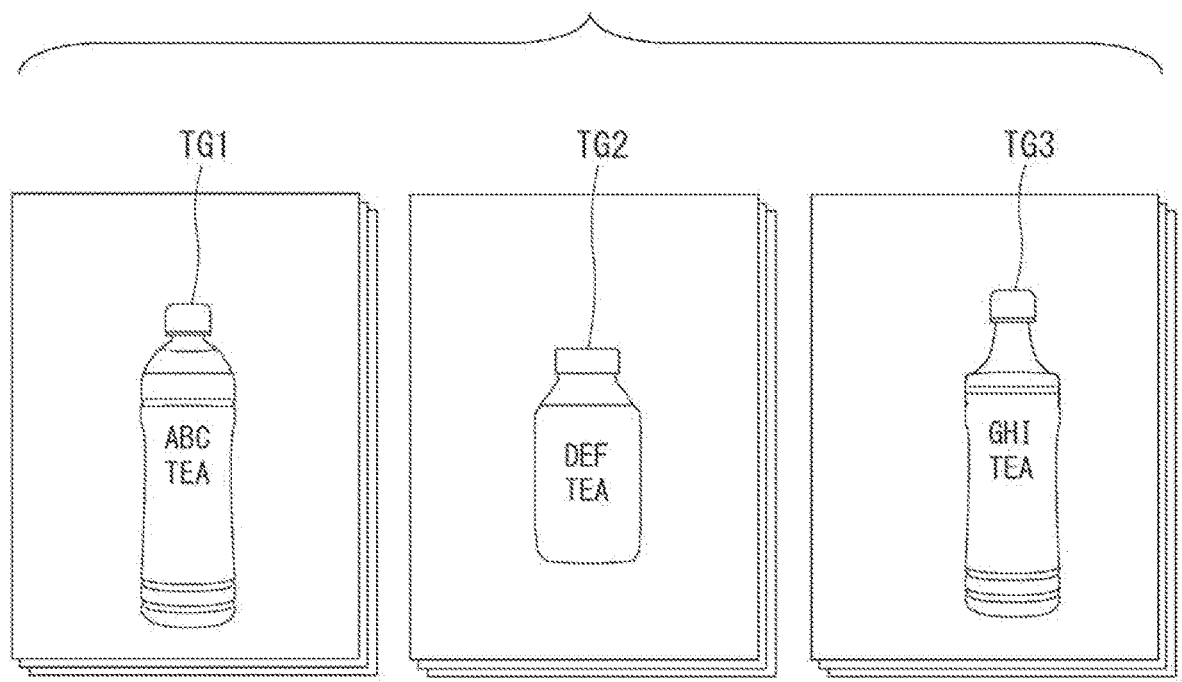
FIG. 4 is a diagram showing an example of images included in reference training data.
Figure 5:
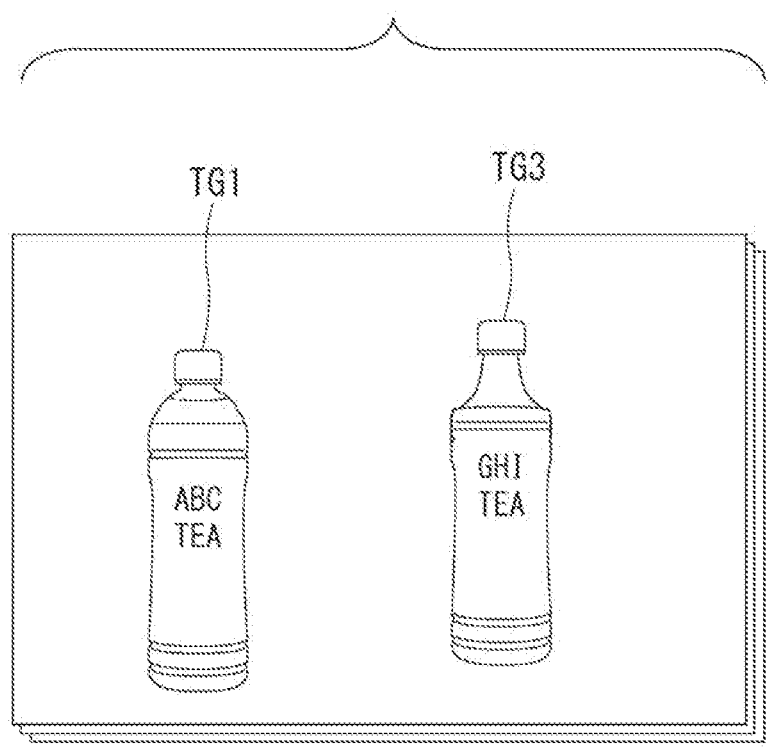
FIG. 5 is a diagram showing an example of images included in additional training data.

Next, operations performed by the learning apparatus 11 will be described with reference to FIGS. 3 to 5. FIG. 3 is a flowchart showing the operations performed by the learning apparatus 11. FIG. 4 is a diagram showing an example of images included in reference training data. FIG. 5 is a diagram showing an example of images included in additional training data.

A description will be given below of an example of a case in which the learning apparatus 11 makes the recognition device (first recognition device) 12_1 learn so that it recognizes the recognition target (first recognition target) TG1 of the first type from among the recognition targets TG1 to TG3 of three types. Specifically, a description will be given below of an example of a case in which the learning apparatus 11 makes the recognition device 12_1 learn so that it recognizes a product "ABC tea", which is the recognition target TG1 of the first type, from among products "ABC tea", "DEF tea", and "GHI tea" of three types, which are the recognition targets TG1 to TG3 of three types.

First, the training data generation unit 111 generates reference training data that includes a plurality of images each individually including a respective one of the recognition targets TG1 to TG3 (Step S101).

Specifically, as shown in the example in FIG. 4, the training data generation unit 111 generates reference training data that includes an image including only the product "ABC tea", which is the recognition target TG1, an image including only the product "DEF tea", which is the recognition target TG2, and an image including only the product "GHI tea", which is the recognition target TG3.

After that, the learning control unit 112 performs training of the recognition device 12_1 using the reference training data (Step S102). That is, the learning control unit 112 makes the recognition device 12_1 perform learning using the reference training data.

Specifically, the learning control unit 112 makes, by using the reference training data, the recognition device 12_1 learn so that it correctly recognizes the recognition target TG1 as the recognition target TG1 and so that it does not falsely recognize each of the recognition targets TG2 and TG3 as the recognition target TG1. In this example, the learning control unit 112 makes the recognition device 12_1 learn so that it correctly recognizes the product "ABC tea", which is the recognition target TG1, as the product "ABC tea" and so that it does not falsely recognize each of the products "DEF tea" and "GHI tea", which are the recognition targets TG2 and TG3, as the product "ABC tea".

After that, the evaluation unit 113 evaluates the recognition device 12_1 (Step S103). Specifically, the evaluation unit 113 evaluates whether the recognition device 12_1 correctly recognizes the recognition target TG1 as the recognition target TG1 and whether the recognition device 12_1 does not falsely recognize each of the recognition targets TG2 and TG3 as the recognition target TG1. In this example, the evaluation unit 113 evaluates whether the recognition device 12_1 correctly recognizes the product "ABC tea", which is the recognition target TG1, as the product "ABC tea" and whether the recognition device 12_1 does not falsely recognize each of the products "DEF tea" and "GHI tea", which are the recognition targets TG2 and TG3, as the product "ABC tea".

The result of the above evaluation by the evaluation unit 113 will clearly indicate whether or not the false recognition target (first false recognition target) FTG1, which is a recognition target in regard to which a probability that the recognition device 12_1 falsely recognizes it as the recognition target TG1 from among the recognition targets TG1 to TG3 is equal to or greater than a predetermined percentage, is present (Step S104).

Note that, when the false recognition target FTG1 is not present (NO in Step S104), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S104), it is determined that the recognition performance of the recognition device 12_1 has not reached a sufficient level, and thus the learning by the recognition device 12_1 is continued.

Specifically, first, the extraction unit 114 extracts the false recognition target FTG1 (NO in Step S105→Step S106). Then, the training data generation unit 111 generates additional training data (first training data) that includes an image including both the false recognition target FTG1 extracted by the extraction unit 114 and the recognition target TG1 (Step S107).

For example, the extraction unit 114 extracts the product "GHI tea", which is the recognition target TG3, as the false recognition target FTG1. In this case, as shown in the example in FIG. 5, the training data generation unit 111 generates additional training data that includes an image including both the product "ABC tea", which is the recognition target TG1, and the product "GHI tea" extracted as the false recognition target FTG1.

After that, the learning control unit 112 performs additional training of the recognition device 12_1 using the additional training data (Step S102). That is, the learning control unit 112 makes the recognition device 12_1 perform additional learning using the additional training data.

Specifically, the learning control unit 112 makes, by using the additional training data, the recognition device 12_1 learn that the false recognition target FTG1 is a recognition target of a type different from that of the recognition target TG1. In this example, the learning control unit 112 makes, by using the additional training data, the recognition device 12_1 learn that the product "GHI tea" extracted as the false recognition target FTG1 is a recognition target of a type different from that of the product "ABC tea", which is the recognition target TG1.

After that, the evaluation unit 113 evaluates the recognition device 12_1 again (Step S103). Specifically, the evaluation unit 113 evaluates whether the recognition device 12_1 correctly recognizes the recognition target TG1 as the recognition target TG1 and whether the recognition device 12_1 does not falsely recognize each of the recognition targets TG2 and TG3 as the recognition target TG1. In this example, the evaluation unit 113 evaluates whether the recognition device 12_1 correctly recognizes the product "ABC tea", which is the recognition target TG1, as the product "ABC tea", and whether the recognition device 12_1 does not falsely recognize each of the products "DEF tea" and "GHI tea", which are the recognition targets TG2 and TG3, as the product "ABC tea".

The result of the above evaluation by the evaluation unit 113 will clearly indicate whether or not the false recognition target FTG1, which is a recognition target in regard to which a probability that the recognition device 12_1 falsely recognizes it as the recognition target TG1 from among the recognition targets TG1 to TG3 is equal to or greater than a predetermined percentage, is present (Step S104).

Note that when the false recognition target FTG1 is not present (NO in Step S104), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S104), it is determined that the recognition performance of the recognition device 12_1 has not reached a sufficient level, and thus the learning by the recognition device 12_1 is continued.

After that, the extraction of the false recognition target FTG1 (NO in Step S105→Step S106), the generation of additional training data (Step S107), the training of the recognition device 12_1 using the additional training data (Step S102), and the evaluation of the recognition device 12_1 (Step S103) are repeated until the false recognition target FTG1 is no longer present. However, when the number of times the training using the additional training data has been performed has reached a predetermined number (YES in Step S104→YES in Step S105) before the false recognition target FTG1 is no longer present, it is determined that there is no possibility that the false recognition target FTG1 will no longer be present, and a notification that there is no possibility that the false recognition target FTG1 will no longer be present is sent to, for example, a user of the system (Step S108). The user, who has received the notification, can then take measures such as changing a learning method.

In the above description of the operations, although the case in which the learning apparatus 11 performs training of the recognition device 12_1 has been described, it is merely an example. The learning apparatus 11 can perform training of the recognition devices other than the recognition device 12_1; that is, the recognition devices 12_2 and 12_3, by performing processes similar to those performed for the recognition device 12_1.

Further, in the above description of the operations, although an example of the case in which the learning apparatus 11 extracts the product "GHI Tea", which is the recognition target TG3, as the false recognition target FTG1 in the process of performing the training of the recognition device 12_1 has been described, it is merely an example.

The learning apparatus 11 may extract the product "DEF tea", which is the recognition target TG2, as the false recognition target FTG1, or it may extract each of the recognition targets TG2 and TG3 as the false recognition target FTG1.

As described above, in learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the learning apparatus 11 according to this embodiment makes the first recognition device learn that the false recognition target is a recognition target of a type different from that of the first recognition target. By doing so, the learning apparatus 11 can make the first recognition device perform learning more efficiently than when it makes the first recognition device learn so that it recognizes all of recognition targets other than the first recognition target as recognition targets of types different from that of the first recognition target. As a result, the learning apparatus 11 can make each of a plurality of recognition devices that recognize a corresponding one of a plurality of types of recognition targets perform learning efficiently so that false recognition among the plurality of types of recognition targets does not occur.

Second Embodiment

Figure 6:
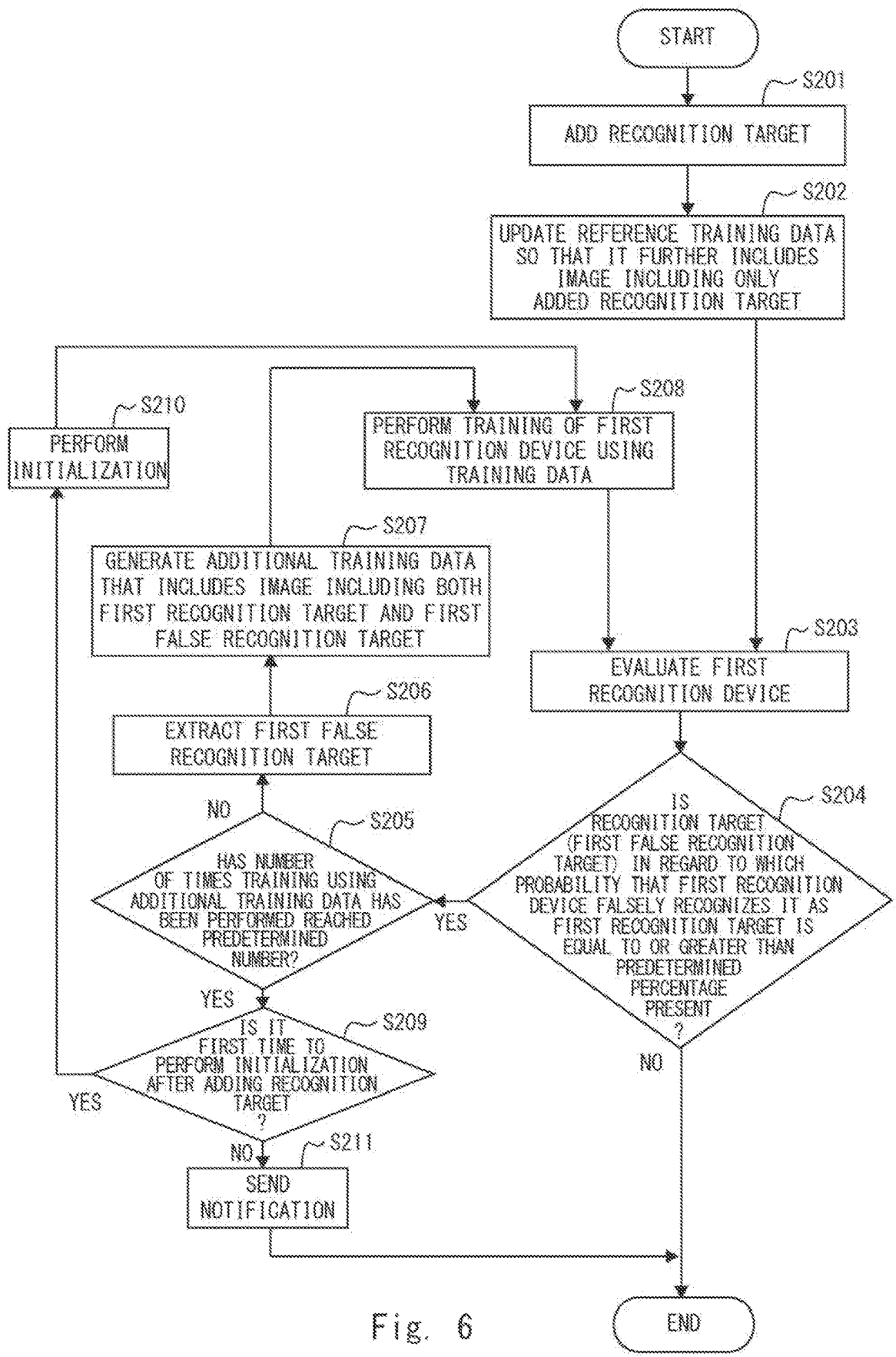
FIG. 6 is a flowchart showing operations performed by a learning apparatus according to a second embodiment.
Figure 7:
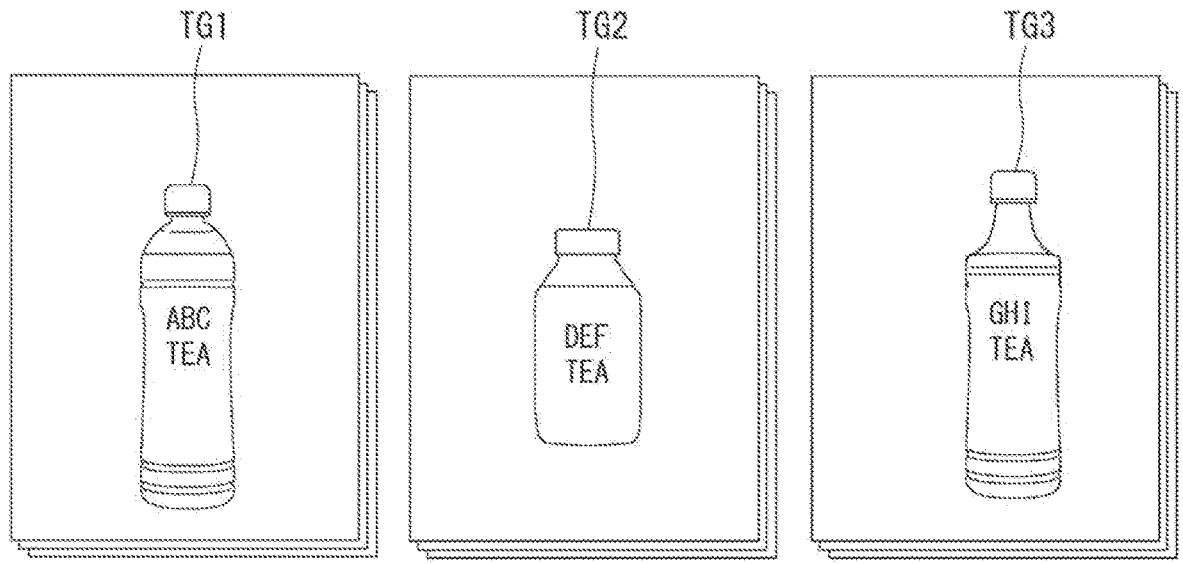
FIG. 7 is a diagram showing an example of images included in reference training data.
Figure 7:
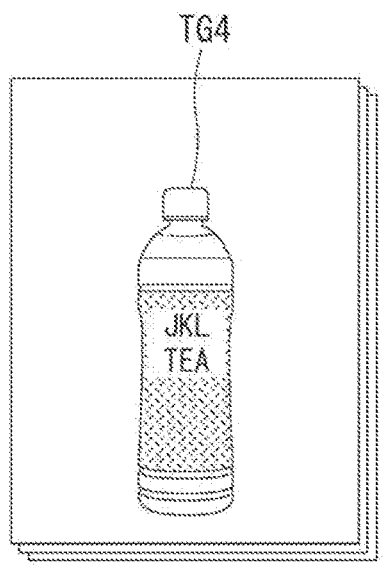
Figure 8:
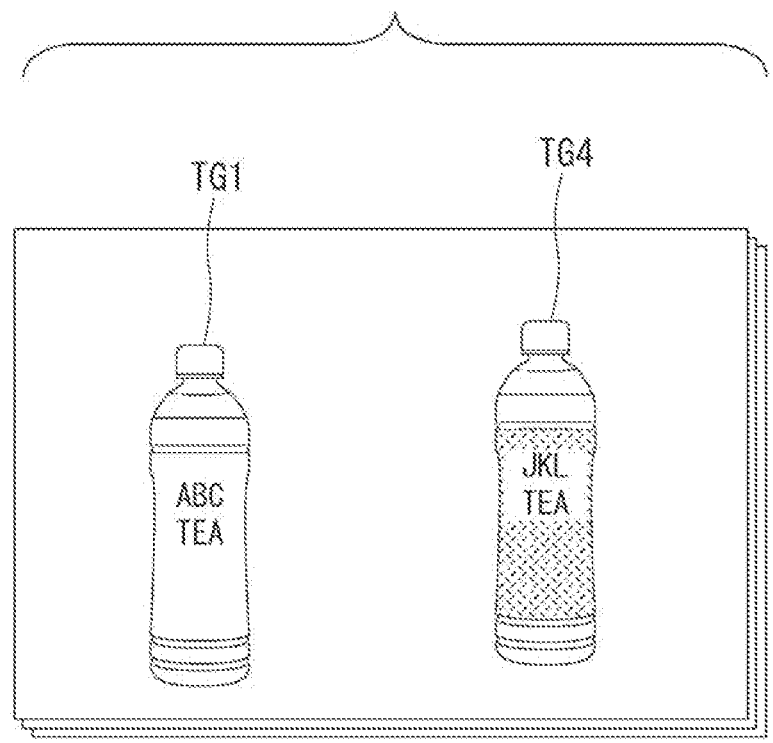
FIG. 8 is a diagram showing an example of images included in additional training data.

In this embodiment, operations performed by the learning apparatus 11 when a recognition target of a new type is added will be described with reference to FIGS. 6 to 8. FIG. 6 is a flowchart showing the operations performed by the learning apparatus 11 according to the second embodiment. FIG. 7 is a diagram showing an example of images included in reference training data. FIG. 8 is a diagram showing an example of images included in additional training data.

A description will be given below of a case in which the learning apparatus 11 makes the recognition device (first recognition device) 12_1 learn so that it recognizes the recognition target (first recognition target) TG1 of the first type from among the recognition targets TG1 to TG3 of three types through, for example, the processes shown in FIG. 3, and then makes the recognition device 12_1 perform learning again in accordance with the addition of a recognition target TG4 of a new type.

First, a recognition target TG4 is added (Step S201). At this time, the training data generation unit 111 generates an image including only the recognition target TG4 and includes it in the reference training data. That is, the training data generation unit 111 updates the reference training data to reference training data that further includes an image including only the recognition target TG4 in addition to a plurality of images each individually including a respective one of the recognition targets TG1 to TG3 (Step S202).

Specifically, as shown in the example in FIG. 7, the training data generation unit 111 updates the reference training data so that it further includes an image including only a product "JKL tea", which is the recognition target TG4, in addition to the image including only the product "ABC tea", which is the recognition target TG1, the image including only the product "DEF tea", which is the recognition target TG2, and the image including only the product "GHI tea", which is the recognition target TG3.

The training of a recognition device 12_4 for recognizing the recognition target TG4 is performed separately from the training of the recognition device 12_1, for example, by the processes as shown in FIG. 3, the description of which will be omitted.

After that, the evaluation unit 113 evaluates the recognition device 12_1 before the training of the recognition device 12_1 is performed using the updated reference training data (Step S203). Specifically, the evaluation unit 113 evaluates whether the recognition device 12_1 correctly recognizes the recognition target TG1 as the recognition target TG1 and whether the recognition device 12_1 does not falsely recognize each of the recognition targets TG2, TG3, and TG4 as the recognition target TG1. In this example, the evaluation unit 113 evaluates whether the recognition device 12_1 correctly recognizes the product "ABC tea", which is the recognition target TG1, as the product "ABC tea" and whether the recognition device 12_1 does not falsely recognize each of the products "DEF tea", "GHI tea", and "JKL tea", which are the recognition targets TG2, TG3, and TG4, as the product "ABC tea".

The result of the above evaluation by the evaluation unit 113 will clearly indicate whether or not the false recognition target (first false recognition target) FTG1, which is a recognition target in regard to which a probability that the recognition device 12_1 falsely recognizes it as the recognition target TG1 from among the recognition targets TG1 to TG4 is equal to or greater than a predetermined percentage, is present (Step S204).

Note that when the false recognition target FTG1 is not present (NO in Step S204), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S204), it is determined that the recognition performance of the recognition device 12_1 has not reached a sufficient level, and thus the learning by the recognition device 12_1 is continued.

Specifically, first, the extraction unit 114 extracts the false recognition target FTG1 (NO in Step S205→Step S206). Then, the training data generation unit 111 generates additional training data (first training data) that includes an image including both the false recognition target FTG1 extracted by the extraction unit 114 and the recognition target TG1 (Step S207).

For example, the extraction unit 114 extracts the product "JKL tea", which is the recognition target TG4, as the false recognition target FTG1. In this case, as shown in the example in FIG. 8, the training data generation unit 111 generates additional training data that includes an image including both the product "ABC tea", which is the recognition target TG1, and the product "JKL tea" extracted as the false recognition target FTG1.

After that, the learning control unit 112 performs additional training of the recognition device 12_1 using the additional training data (Step S208). That is, the learning control unit 112 makes the recognition device 12_1 perform additional learning using the additional training data.

Specifically, the learning control unit 112 makes, by using the additional training data, the recognition device 12_1 learn that the false recognition target FTG1 is a recognition target of a type different from that of the recognition target TG1. In this example, the learning control unit 112 makes, by using the additional training data, the recognition device 12_1 learn that the product "JKL tea" extracted as the false recognition target FTG1 is a recognition target of a type different from that of the product "ABC tea", which is the recognition target TG1.

After that, the evaluation unit 113 evaluates the recognition device 12_1 again (Step S203). Specifically, the evaluation unit 113 evaluates whether the recognition device 12_1 correctly recognizes the recognition target TG1 as the recognition target TG1 and whether the recognition device 12_1 does not falsely recognize each of the recognition targets TG2, TG3, and TG4 as the recognition target TG1. In this example, the evaluation unit 113 evaluates whether the recognition device 12_1 correctly recognizes the product "ABC tea", which is the recognition target TG1, as the product "ABC tea", and whether the recognition device 12_1 does not falsely recognize each of the products "DEF tea", "GHI tea", and "JKL tea", which are the recognition targets TG2, TG3, and TG4, as the product "ABC tea".

The result of the above evaluation by the evaluation unit 113 will clearly indicate whether or not the false recognition target FTG1, which is a recognition target in regard to which a probability that the recognition device 12_1 falsely recognizes it as the recognition target TG1 from among the recognition targets TG1 to TG4 is equal to or greater than a predetermined percentage, is present (Step S204).

Note that when the false recognition target FTG1 is not present (NO in Step S204), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S204), it is determined that the recognition performance of the recognition device 12_1 has not reached a sufficient level, and thus the learning by the recognition device 12_1 is continued.

After that, the extraction of the false recognition target FTG1 (NO in Step S205→Step S206), the generation of additional training data (Step S207), the training of the recognition device 12_1 using the additional training data (Step S208), and the evaluation of the recognition device 12_1 (Step S203) are repeated until the false recognition target FTG1 is no longer present.

However, when the number of times the training using the additional training data has been performed has reached a predetermined number (YES in Step S204→YES in Step S205) before the false recognition target FTG1 is no longer present, all the contents learned by the recognition device 12_1 are initialized only once (YES in Step S209→Step S210).

After the initialization, the learning control unit 112 performs the training of the recognition device 12_1 using the updated reference training data (Step S208). That is, the learning control unit 112 performs the training of the recognition device 12_1 again using the updated reference training data that includes a plurality of images each individually including a respective one of the recognition targets TG1 to TG4.

After that, the evaluation unit 113 evaluates the recognition device 12_1 (Step S203). The result of the above evaluation by the evaluation unit 113 will clearly indicate whether or not the false recognition target FTG1 is present (Step S204).

Note that when the false recognition target FTG1 is not present (NO in Step S204), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S204), it is determined that the recognition performance of the recognition device 12_1 has not reached a sufficient level, and thus the learning by the recognition device 12_1 is continued.

After that, the extraction of the false recognition target FTG1 (NO in Step S205→Step S206), the generation of additional training data (Step S207), the training of the recognition device 12_1 using the additional training data (Step S208), and the evaluation of the recognition device 12_1 (Step S203) are repeated until the false recognition target FTG1 is no longer present.

However, when the number of times the training using the additional training data has been performed has reached a predetermined number again (YES in Step S204→YES in Step S205→NO in Step S209) before the false recognition target FTG1 is no longer present, it is determined that there is no possibility that the false recognition target FTG1 will no longer be present, and a notification that there is no possibility that the false recognition target FTG1 will no longer be present is sent to, for example, a user of the system (Step S211). The user, who has received the notification, can then take measures such as changing a learning method.

As described above, in learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the learning apparatus 11 according to this embodiment makes the first recognition device learn that the false recognition target is a recognition target of a type different from that of the first recognition target. By doing so, the learning apparatus 11 can make the first recognition device perform learning more efficiently than when it makes the first recognition device learn so that it recognizes all of recognition targets other than the first recognition target as recognition targets of types different from that of the first recognition target. As a result, the learning apparatus 11 can make each of a plurality of recognition devices that recognize a corresponding one of a plurality of types of recognition targets perform learning efficiently so that false recognition among the plurality of types of recognition targets does not occur.

Further, even when a recognition target of a new type is added after the first recognition device has performed learning, the learning apparatus 11 according to this embodiment evaluates the first recognition device before it makes the first recognition device perform learning again, and makes the first recognition device perform learning again only when required. By doing so, the learning apparatus 11 can prevent the first recognition device from performing learning again unnecessarily. Further, even when the learning apparatus 11 makes the first recognition device perform learning again, the learning apparatus 11 makes the first recognition device perform learning again while leaving the contents that have already been learned in the first recognition device. By doing so, the learning apparatus 11 can makes the first recognition device perform learning again efficiently.

Third Embodiment

Figure 9:
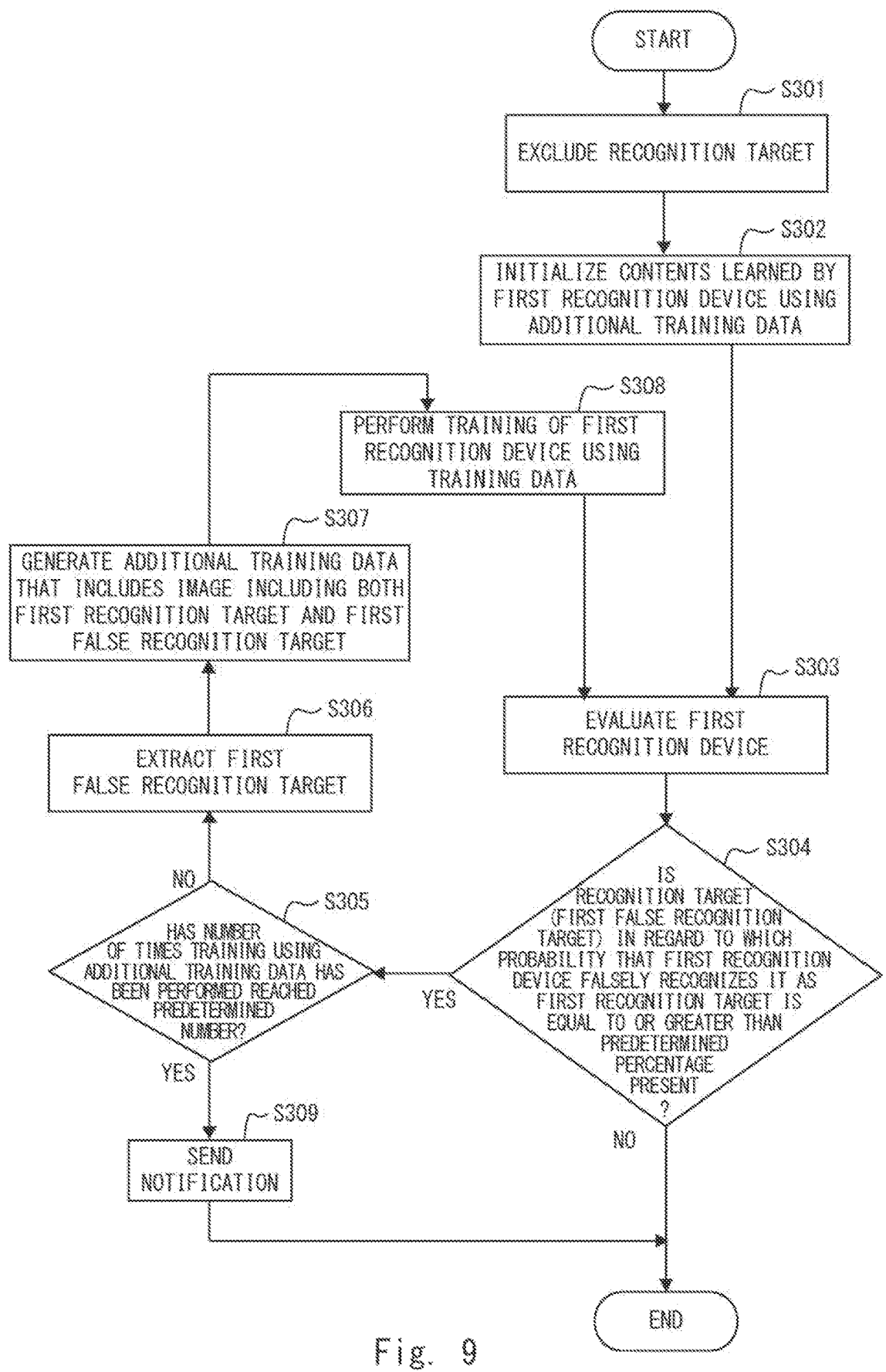
FIG. 9 is a flowchart showing operations performed by a learning apparatus according to a third embodiment.

In this embodiment, operations performed by the learning apparatus 11 when any of a plurality of recognition targets is excluded will be described with reference to FIG. 9. FIG. 9 is a flowchart showing the operations performed by the learning apparatus 11 according to the third embodiment.

A description will be given below of a case in which the learning apparatus 11 makes the recognition device (first recognition device) 12_1 learn so that it recognizes the recognition target (first recognition target) TG1 of the first type from among the recognition targets TG1 to TG3 of three types through, for example, the processes shown in FIG. 3, and then makes the recognition device 12_1 perform learning again, for example, in accordance with the exclusion of the recognition target TG2.

First, the recognition target TG2 is excluded (Step S301). At this time, the training data generation unit 111 may delete an image including only the recognition target TG2 from a plurality of images included in reference training data. That is, the training data generation unit 111 may update the reference training data to reference training data from which the image including only the recognition target TG2 is deleted.

After that, the contents learned by the recognition device 12_1 using additional training data are initialized (Step S302). As a result, the learned contents about the recognition target TG2 for which it is not necessary to determine whether or not it is the recognition target TG1 are erased. Therefore, it is expected that the performance of the recognition device 12_1 will be improved. At this time, the contents learned by the recognition device 12_1 using reference training data may be initialized in addition to the contents learned by the recognition device 12_1 using additional training data. That is, all the contents learned by the recognition device 12_1 may be initialized.

After that, the evaluation unit 113 evaluates the recognition device 12_1 before the training of the recognition device 12_1 is performed (Step S303). Specifically, the evaluation unit 113 evaluates whether the recognition device 12_1 correctly recognizes the recognition target TG1 as the recognition target TG1 and whether the recognition device 12_1 does not falsely recognize the recognition targets TG3 as the recognition target TG1.

The result of the above evaluation by the evaluation unit 113 will clearly indicate whether or not the false recognition target (first false recognition target) FTG1, which is a recognition target in regard to which a probability that the recognition device 12_1 falsely recognizes it as the recognition target TG1 from among the recognition targets TG1 and TG3 is equal to or greater than a predetermined percentage, is present (Step S304).

Note that when the false recognition target FTG1 is not present (NO in Step S304), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S304), it is determined that the recognition performance of the recognition device 12_1 has not reached a sufficient level, and thus the learning by the recognition device 12_1 is continued.

Specifically, first, the extraction unit 114 extracts the false recognition target FTG1 (NO in Step S305→Step S306). Then, the training data generation unit 111 generates additional training data (first training data) that includes an image including both the false recognition target FTG1 extracted by the extraction unit 114 and the recognition target TG1 (Step S307).

After that, the learning control unit 112 performs additional training of the recognition device 12_1 using the additional training data (Step S308). That is, the learning control unit 112 makes the recognition device 12_1 perform additional learning using the additional training data. Specifically, the learning control unit 112 makes, by using the additional training data, the recognition device 12_1 learn that the false recognition target FTG1 is a recognition target of a type different from that of the recognition target TG1.

After that, the evaluation unit 113 evaluates the recognition device 12_1 again (Step S303). Specifically, the evaluation unit 113 evaluates whether the recognition device 12_1 correctly recognizes the recognition target TG1 as the recognition target TG1 and whether the recognition device 12_1 does not falsely recognize the recognition targets TG3 as the recognition target TG1.

The result of the above evaluation by the evaluation unit 113 will clearly indicate whether or not the false recognition target FTG1, which is a recognition target in regard to which a probability that the recognition device 12_1 falsely recognizes it as the recognition target TG1 from among the recognition targets TG1 and TG3 is equal to or greater than a predetermined percentage, is present (Step S304).

Note that when the false recognition target FTG1 is not present (NO in Step S304), it is determined that the recognition performance of the recognition device 12_1 has reached a sufficient level, and thus the learning by the recognition device 12_1 ends without extraction being performed by the extraction unit 114.

On the other hand, when the false recognition target FTG1 is present (YES in Step S304), it is determined that the recognition performance of the recognition device 12_1 has not reached a sufficient level, and thus the learning by the recognition device 12_1 is continued.

After that, the extraction of the false recognition target FTG1 (NO in Step S305→Step S306), the generation of additional training data (Step S307), the training of the recognition device 12_1 using the additional training data (Step S308), and the evaluation of the recognition device 12_1 (Step S303) are repeated until the false recognition target FTG1 is no longer present.

However, when the number of times the training using the additional training data has been performed has reached a predetermined number (YES in Step S304→YES in Step S305) before the false recognition target FTG1 is no longer present, it is determined that there is no possibility that the false recognition target FTG1 will no longer be present, and a notification that there is no possibility that the false recognition target FTG1 will no longer be present is sent to, for example, a user of the system (Step S309). The user, who has received the notification, can then take measures such as changing a learning method.

As described above, in learning of a first recognition device for recognizing a first recognition target of a predetermined type, only when a recognition target (a false recognition target), which is a recognition target of a type different from that of the first recognition target and in regard to which a probability that the first recognition device falsely recognizes it as the first recognition target is equal to or greater than a predetermined percentage, is present, the learning apparatus 11 according to this embodiment makes the first recognition device learn that the false recognition target is a recognition target of a type different from that of the first recognition target. By doing so, the learning apparatus 11 can make the first recognition device perform learning more efficiently than when it makes the first recognition device learn so that it recognizes all of recognition targets other than the first recognition target as recognition targets of types different from that of the first recognition target. As a result, the learning apparatus 11 can make each of a plurality of recognition devices that recognize a corresponding one of a plurality of types of recognition targets perform learning efficiently so that false recognition among the plurality of types of recognition targets does not occur.

Further, when a learned recognition target different from the first recognition target is excluded after the first recognition device has performed learning, the learning apparatus 11 according to this embodiment initializes the content about the excluded recognition target learned by the first recognition device, whereby the learned contents about the recognition target for which it is not necessary to determine whether or not it is the first recognition target are erased. Therefore, it is possible to improve the performance of the first recognition device.

Note that the present disclosure is not limited to the above-described embodiments and may be changed as appropriate without departing from the scope of the present disclosure.

Further, in the present disclosure, it is possible to implement all or part of control processing performed by the conveyance system by causing a Central Processing Unit (CPU) to execute a computer program.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A learning apparatus comprising a central processing unit (CPU) configured to execute a computer program to:
   generate reference training data that includes a plurality of images respectively including a plurality of types of recognition targets, each image including an individual recognition target;
   train, by using the reference training data, a first recognition device to recognize a first recognition target from among the plurality of types of recognition targets, the first recognition target being a recognition target of a first type;
   extract, from among the plurality of types of recognition targets, a first false recognition target of a type that is different from the first type, the first false recognition target being a recognition target which has a probability of being falsely recognized as the first recognition target by the first recognition device that is equal to or greater than a predetermined percentage;

generate first training data that includes an image including both the first recognition target of the first type and the first false recognition target of a type that is different from the first type; and train, by using the first training data, the first recognition device to recognize that the first false recognition target is a recognition target of a type that is different from the first type of the first recognition target.

2. The learning apparatus according to claim 1, wherein the CPU is further configured to execute the computer program to:

control, when the probability that the first recognition device falsely recognizes the first false recognition target as the first recognition target becomes less than the predetermined percentage, the first recognition device so that the first recognition device stops learning using the first training data.

3. The learning apparatus according to claim 1, wherein the CPU is further configured to execute the computer program to:

train, by using the reference training data, the first recognition device to correctly recognize the first recognition target as the first recognition target and to not falsely recognize a recognition target other than the first recognition target as the first recognition target, evaluate whether the first recognition device correctly recognizes the first recognition target as the recognition target and whether the first recognition device does not falsely recognize a recognition target other than the first recognition target as the first recognition target, and extract the first false recognition target from a result of the evaluation.

4. The learning apparatus according to claim 3, wherein the CPU is further configured to execute the computer program to:

evaluate, when a third recognition target that is a new recognition target of a third type is added to the plurality of types of recognition targets, whether the first recognition device does not falsely recognize the third recognition target as the first recognition target before the first recognition device is trained to recognize that the third recognition target is not the first recognition target, and extract, from a result of the evaluation, the first false recognition target which has a probability of being falsely recognized as the first recognition target by the first recognition device, from among the plurality of types of recognition targets including the third recognition target, that is equal to or greater than a predetermined percentage.

5. The learning apparatus according to claim 4, wherein the CPU is further configured to execute the computer program to:

update the reference training data so as to further include an image including only the third recognition target among the plurality of types of recognition targets, and when the probability that the first recognition device falsely recognizes the first false recognition target as the first recognition target is maintained at or above the predetermined percentage even though the first recognition device has been trained using the first training data, initialize contents learned by the first recognition device and then train the first recognition device using at least the updated reference training data.

6. The learning apparatus according to claim 4, wherein the CPU is further configured to execute the computer program to:

train a third recognition device to recognize the third recognition target from among the plurality of types of recognition targets, the third recognition target being a recognition target of a third type, extract, from the plurality of types of recognition targets, a third false recognition target of a type that is different from the third type, the third false recognition target being a recognition target which has a probability of being falsely recognized as the third recognition target by the third recognition device that is equal to or greater than a predetermined percentage, generate third training data that includes an image including both the third recognition target of the third type and the third false recognition target of a type that is different from the third type, and train, by using the third training data, the third recognition device to recognize that the third false recognition target is a recognition target of a type that is different from the third type of the third recognition target.

7. The learning apparatus according to claim 1, wherein the CPU is further configured to execute the computer program to:

generate the first training data that includes a plurality of images each including both the first recognition target and the first false recognition target, and train, by using the first training data, the first recognition device to recognize that the first false recognition target is a recognition target of a type that is different from that first type of the first recognition target, until the probability that the first recognition device falsely recognizes the first false recognition target as the first recognition target becomes less than the predetermined percentage.

8. The learning apparatus according to claim 1, wherein the CPU is further configured to execute the computer program to:

generate, by using a plurality of the first false recognition targets, each of the first false recognition targets being a recognition target which has a probability of being recognized as the first recognition target by the first recognition device that is equal to or greater than a predetermined percentage, the first training data that includes a plurality of images each including both the first recognition target and each one of the plurality of the first false recognition targets, and train, by using the first training data, the first recognition device to recognize that each of the plurality of the first false recognition targets is a recognition target of a type that is different from the first type of the first recognition target, until the probability that the first recognition device falsely recognizes each of the plurality of the first false recognition targets as the first recognition target becomes less than the predetermined percentage.

9. The learning apparatus according to claim 1, wherein the CPU is further configured to execute the computer program to:

train a second recognition device to recognize a second recognition target from among the plurality of types of recognition targets, the second recognition target being a recognition target of a second type, extract, from among the plurality of types of recognition targets, a second false recognition target of a type that is different from the second type, the second false recognition target being a recognition target which has a probability of being falsely recognized as the second recognition target by the second recognition device that is equal to or greater than a predetermined percentage, generate second training data that includes an image including both the second recognition target of the second type and the second false recognition target of a type that is different from the second type, and train, by using the second training data, the second recognition device to recognize that the second false recognition target is a recognition target of a type that is different from the second type of the second recognition target.

10. The learning apparatus according to claim 9, wherein the CPU is further configured to execute the computer program to:

when a fourth recognition target that is a recognition target of a fourth type is excluded from the plurality of types of recognition targets, newly extract the first false recognition target which has a probability of being falsely recognized as the first recognition target from among the plurality of types of recognition targets excluding the fourth recognition target, and the second false recognition target which has a probability of being falsely recognized as the second recognition target from among the plurality of types of recognition targets excluding the fourth recognition target, in a state in which contents learned by the first recognition device using the first training data have been initialized and the contents learned by the second recognition device using the second training data have been initialized, newly generate the first training data that includes an image including both the first recognition target and the newly extracted first false recognition target and the second training data that includes an image including both the second recognition target and the newly extracted second false recognition target, and train the first recognition device using the newly generated first training data and initialize the contents learned by the first recognition device using the first training data, and train the second recognition device using the newly generated second training data and initialize the contents learned by the second recognition device using the second training data.

11. The learning apparatus according to claim 9, wherein the CPU is further configured to execute the computer program to:

to control, when the probability that the second recognition device falsely recognizes the second false recognition target as the second recognition target becomes less than the predetermined percentage, the second recognition device so that the second recognition device stops the learning using the second training data.

12. The learning apparatus according to claim 9, wherein the CPU is further configured to execute the computer program to:

train, by using the reference training data, the first recognition device to correctly recognize the first recognition target as the first recognition target and to not falsely recognize a recognition target other than the first recognition target as the first recognition target, train, by using the reference training data, the second recognition device to correctly recognize the second recognition target as the second recognition target and to not falsely recognize a recognition target other than the second recognition target as the second recognition target, evaluate whether the first recognition device correctly recognizes the first recognition target as the recognition target and whether the first recognition device does not falsely recognize a recognition target other than the first recognition target as the first recognition target, evaluate whether the second recognition device correctly recognizes the second recognition target as the recognition target and whether the second recognition device does not falsely recognize a recognition target other than the second recognition target as the second recognition target, and extract the first false recognition target and the second false recognition target from a result of the evaluation.

13. The learning apparatus according to claim 12, wherein the CPU is further configured to execute the computer program to:

evaluate, when a third recognition target that is a new recognition target of a third type is added to the plurality of types of recognition targets, whether the first recognition device does not falsely recognize the third recognition target as the first recognition target before the first recognition device is trained to recognize that the third recognition target is not the first recognition target and whether the second recognition device does not falsely recognize the third recognition target as the second recognition target before the second recognition device is trained to recognize that the third recognition target is not the second recognition target, and extract, from a result of the evaluation the first false recognition target which has a probability of being falsely recognized as the first recognition target by the first recognition device, from among the plurality of types of recognition targets including the third recognition target, that is equal to or greater than a predetermined percentage, and the second false recognition target which has a probability of being falsely recognized as the second recognition target by the second recognition device, from among the plurality of types of recognition targets including the third recognition target, that is equal to or greater than a predetermined percentage.

14. The learning apparatus according to claim 13, wherein the CPU is further configured to execute the computer program to:

update the reference training data so as to further include an image including only the third recognition target among the plurality of types of recognition targets, and when the probability that the first recognition device falsely recognizes the first false recognition target as the first recognition target is maintained at or above the predetermined percentage even though the first recognition device has been trained using the first training data, initialize contents learned by the first recognition device and then train the first recognition device using at least the updated reference training data, and, when the probability that the second recognition device falsely recognizes the second false recognition target as the second recognition target is maintained at or above the predetermined percentage even though the second recognition device has been trained using the second training data, initialize contents learned by the second recognition device and then train the second recognition device using at least the updated reference training data.

15. The learning apparatus according to claim 1, wherein the CPU is further configured to execute the computer program to:
when a fourth recognition target that is a recognition target of a fourth type is excluded from the plurality of types of recognition targets, newly extract the first false recognition target which has a probability of being falsely recognized as the first recognition target by the first recognition device from among the plurality of types of recognition targets excluding the fourth recognition target in a state in which contents learned by the first recognition device using the first training data have been initialized,
newly generate the first training data that includes an image including both the first recognition target and the newly extracted first false recognition target, and
train the first recognition device using the newly generated first training data and initialize the contents learned by the first recognition device using the first training data.

16. A method for controlling a learning apparatus the method comprising:
generating reference training data that includes a plurality of images respectively including a plurality of types of recognition targets, each image including an individual recognition target;
training, by using the reference training data, a first recognition device to recognize a first recognition target from among the plurality of types of recognition targets, the first recognition target being a recognition target of a first type;
extracting, from among the plurality of types of recognition targets, a first false recognition target of a type that is different from the first type, the first false recognition target being a recognition target which has a probability of being falsely recognized as the first recognition target by the first recognition device that is equal to or greater than a predetermined percentage;
generating first training data that includes an image including both the first recognition target of the first type and the first false recognition target of a type that is different from the first type; and
training, by using the first training data, the first recognition device to recognize that the first false recognition target is a recognition target of a type that is different from the first type of the first recognition target.

17. A non-transitory computer readable medium storing a control program for a learning apparatus, the control program being configured to cause a computer to:
generate reference training data that includes a plurality of images respectively including a plurality of types of recognition targets, each image including an individual recognition target;
train, by using the reference training data, a first recognition device to recognize a first recognition target from among the plurality of types of recognition targets, the first recognition target being a recognition target of a first type;
extract, from among the plurality of types of recognition targets, a first false recognition target of a type that is different from the first type, the first false recognition target being a recognition target which has a probability of being falsely recognized as the first recognition target by the first recognition device is equal to or greater than a predetermined percentage;
generate first training data that includes an image including both the first recognition target of the first type and the first false recognition target of a type that is different from the first type; and
train, by using the first training data, the first recognition device to recognize that the first false recognition target is a recognition target of a type that is different from the first type of the first recognition target.

\* \* \* \* \*